Figure 1:
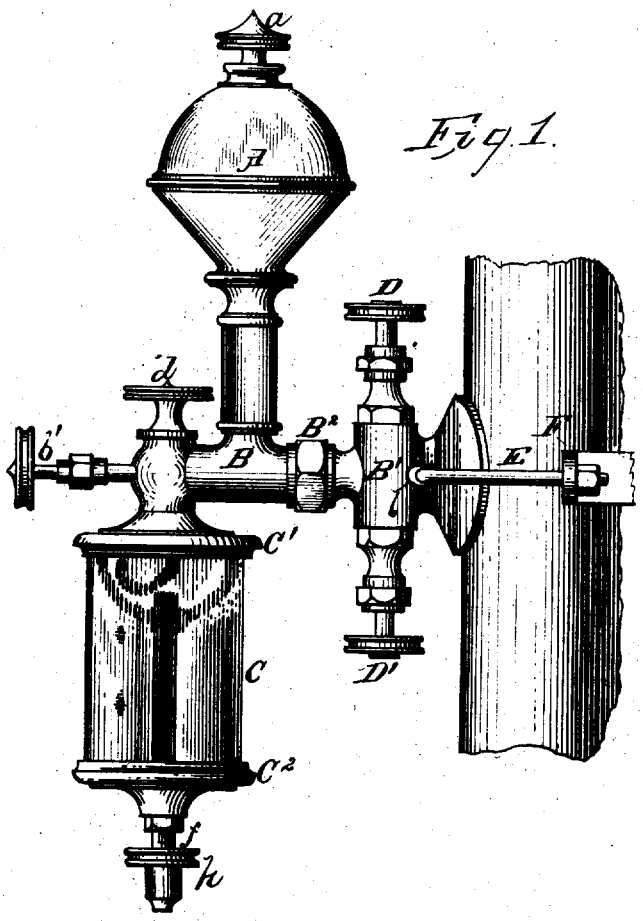

2 Sheets—Sheet 1.

J. V. & J. J. RENCHARD.

Assignors of one-tenth to A. RINSCHEDE.

LUBRICATOR.

No. 9,879. Reissued Sept. 20, 1881.

Witnesses:

E. G. Asmus

J. C. Peck

Inventors:

John J. Renchard

J. Vincent Renchard

By Jas B. Enrix

Attorney

2 Sheets—Sheet 2.

J. V. & J. J. RENCHARD.

Assignors of one-tenth to A. RINSCHEDE.

LUBRICATOR.

No. 9,879. Reissued Sept. 20, 1881.

Witnesses:
E. G. Asmus
J. B. Peck

Inventors:
John F. Renchard
J. Vincent Renchard
By Jas. P. Ennis
Attorney.

UNITED STATES PATENT OFFICE.

J. VINCENT RENCHARD AND JOHN J. RENCHARD, OF DETROIT, MICH., ASSIGNORS OF ONE-TENTH TO ANTHONY RINSCHEDE, OF SAME PLACE.

LUBRICATOR.

SPECIFICATION forming part of Reissued Letters Patent No. 9,879, dated September 20, 1881.

Original No. 184,426, dated November 14, 1876. Application for reissue filed June 3, 1881.

*To all whom it may concern:*

Be it known that we, J. VINCENT RENCHARD and JOHN J. RENCHARD, citizens of the United States, residing in the city of Detroit, in the county of Wayne and State of Michigan, have invented certain new and useful Improvements in Lubricators; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to improvements in that class of lubricators which are used in connection with steam-pipes for lubricating the interior of engines, from and by which the lubricant is forced into the pipe while under steam-pressure; and it pertains more especially to that class in which separate oil and water reservoirs are used, and by which the water from the water-reservoir is employed to displace the oil in the oil-cup and force or convey it therefrom to the steam-pipe.

Our invention consists, first, in providing said separate oil and water reservoirs with separate passages through the single supporting trunk or stem by which the lubricator is attached to the steam-pipe, through one of which passages steam passes from the steam-pipe to the water-reservoir; through the other the oil passes from the oil-reservoir to the steam-pipe.

Our invention consists, second, in providing a curved tube or water-trap communicating from the upper reservoir to the lower reservoir, terminating at or near the upper end of said lower reservoir, by which the water is compelled to take an upward course in said trap before escaping therefrom.

Our invention consists, third, in providing a vertical tube in connection with the separate steam-passage in said trunk within said separate water-reservoir, as adapted to conduct the steam from said separate passage to or near the top of said water-reservoir.

Our invention consists, fourth, in providing the entrance of said curved tube or water-seal with a water-supply-regulating valve adapted to govern the flow of water from the water-reservoir to the oil-reservoir.

It is obvious that by providing two separate passages in the connecting-trunk, one for the steam and one for the oil, the two opposing currents are prevented from coming in contact with and obstructing each other, the passages are less liable to become stopped, and a more uniform feed is attained; second, by forming both passages in the same supporting-trunk but one trunk or connection becomes necessary, the construction is simplified, and the lubricator is more easily attached to a steam-pipe; third, by using a seal or trap having an upward-discharging orifice the water may be discharged below the surface in the volume of oil without permitting the oil to enter the water-reservoir, and we are thus enabled to locate the point of the discharge of water where it may be readily seen as it descends drop by drop through the oil, and from the flow of water readily ascertain and regulate the quantity of the flow of oil; fourth, by extending the steam-tube to the upper end of the condensing-chamber or water-reservoir above the water, the water therein is prevented from flowing back through the steam-passage to the steam-pipe.

Our invention is further explained by reference to the accompanying drawings, in which—

Figure 2:
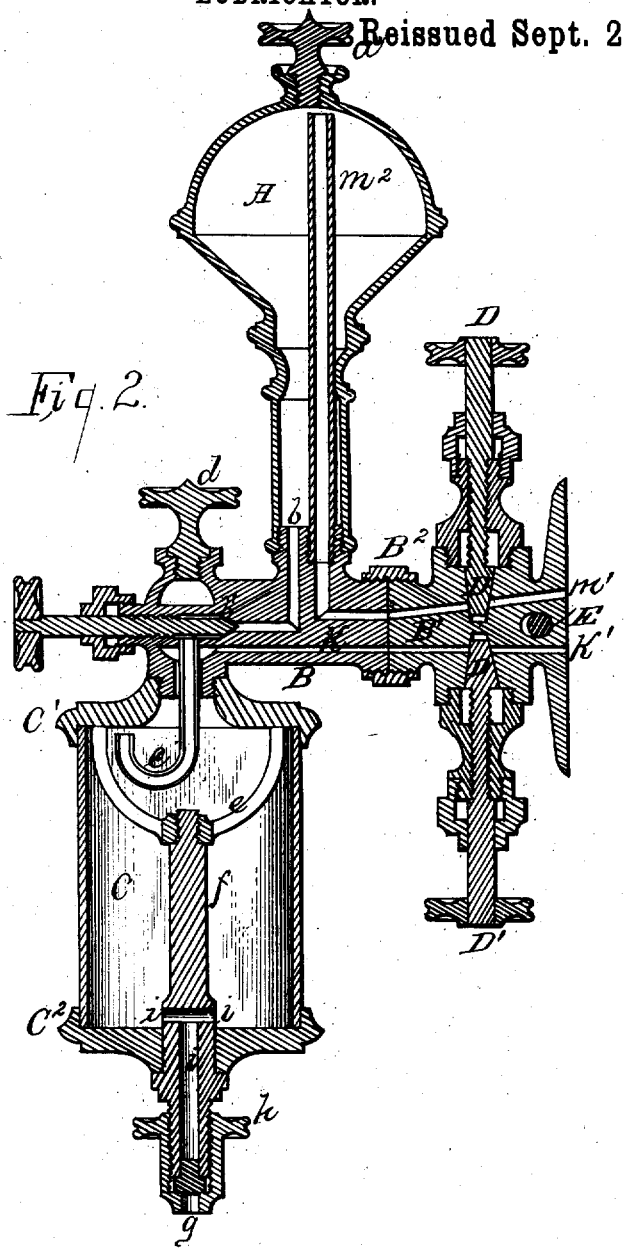

Figure 1, Sheet 1, is an elevation showing our device applied to the steam-pipe of an engine. Fig. 2, Sheet 2, is a vertical section of the same.

Like parts are represented by the same reference-letters in both views.

A is the condensing-chamber or water-reservoir. B is the supporting-trunk, by which the lubricator is connected with the steam-pipe F. C is a glass cylinder or oil-cup. The supporting-trunk B is arranged in a horizontal position at right angles to said water and oil reservoirs.

M′ is the steam-passage through which steam is conducted from the steam-pipe to the water-reservoir.

K is the oil-passage through which oil is conducted from the glass cylinder to the steam-pipe.

*o* is a seal or trap, conforming in shape to an inverted siphon-tube, which is adapted to discharge water from the reservoir into the oil-cup, while it closes all communication in the inverse direction.

*d* is a stopper to the mouth of the oil-cup, through which mouth the cup is filled with oil.

B′ is a "trunk-continuation," so called, the object of which is to facilitate in attaching the lubricator to steam-pipes when the pipes are under steam-pressure, by means of which the steam-pipe may be tapped and the lubricator attached thereto without permitting the steam to escape. It is obvious, however, that the trunk-continuation B′ and coupling $B^2$ may be dispensed with and the end of the trunk B connected directly with the steam-pipe.

$M^2$ is the vertical steam-tube which conducts the steam from the passage M′ to the top of the water-reservoir.

*b* is a passage through which water is conducted from the water-reservoir to the tube *c*.

*b*′ is a screw-valve, by which the flow of water from the reservoir A to the oil-cup is governed. A valve, *g*, is provided at the bottom of the oil-cup, through which the accumulations of water are drawn from beneath the oil.

E is a "clasp" or "stirrup," so called, by which the trunk-continuation, when used, is secured to the steam-pipe.

Our lubricator is operated as follows: The passages M′ and K being first closed, as shown in Fig. 2, the stopper *d* is removed and the transparent cylinder or oil-cup C is filled with oil. Stopper *d* is then replaced, when stoppers *b*′ and D D are withdrawn from the respective passages. Thereupon the steam enters through passage M′ and steam-tube $M^2$, and escapes at the top of the reservoir A, when it is converted into water, which flows down through passage *b* and tube *c* into the oil-cup C. The water is governed by the valve *b*, so that it escapes gradually, drop by drop, as indicated in Fig. 1, and descends slowly through the oil to the bottom of the cup, when, owing to its greater specific gravity, it buoys up and displaces an equal quantity of oil, forcing it out through the passage K into the steam-pipe, from whence it is conveyed by the action of the steam to the parts to be lubricated.

It is obvious that as the mouth of the inverted siphon-tube *c* is upward it is impossible for oil and other floating substances of less specific gravity than water to enter it, as they would be required to first sink through the water in the short arm of the tube; while it is obvious that were the mouth of the tube downward the water in its descent beneath the oil would force the oil up into the tube, and the water and oil would gradually change places. Thus it is further obvious that not only the oil but all floating impurities are excluded from the tube and water-passage, and the danger from choking the water-passage and valve is obviated.

We are aware that a trap or seal for excluding oil from the water-reservoir has previously been formed by a vertically-arranged straight tube, which communicated from the water-reservoir to the bottom of the oil-cup, terminating below the surface of the water. When thus arranged the water surrounding and filling the mouth of the tube serves to exclude the oil. It is obvious, however, that with such a device it becomes impossible to see the water as it escapes from the mouth of the tube or to ascertain or regulate the flow of oil; while by curving the tube, as described, or so shaping it as to bring its mouth or discharging-orifice upward, we are enabled to discharge the water within the volume of oil at any point desired where it can most conveniently be seen and regulated.

Having thus described our invention, what we claim as new, and desire to secure by Letters Patent, is—

1. In a displacement-lubricator having separate oil and water reservoirs, a single supporting-trunk provided with separate oil and steam passages, communicating, respectively, one between the oil-reservoir and steam-pipe, and the other between the steam-pipe and water-reservoir, substantially as and for the purpose specified.

2. In lubricators, a curved tube adapted by its curved shape to form a fluid-trap, having its mouth or entrance connected with the upper reservoir and its discharge-orifice terminating upwardly in or near the upper end of a transparent oil-receptacle, as adapted to discharge the water or other fluid received from the upper receptacle within the volume of oil or other fluid in the lower receptacle, while it prevents an interchange of the respective fluids, substantially as and for the purpose set forth.

3. In displacement-lubricators, the combination of a water-reservoir, a supporting-trunk having separate steam and oil passages arranged horizontally at right angles to said reservoir, a fluid-trap having its discharge-orifice turned upwardly, and a transparent oil-receptacle, said fluid-trap being adapted to receive the water from the water-reservoir and discharge the same in visible drops within the volume of oil, substantially as and for the purpose set forth.

4. In lubricators, the combination of a supporting-trunk having separate steam and oil passages, a condensing-chamber or water-reservoir supported upon said trunk, and a steam-tube vertically arranged within said reservoir, in communication with the separate steam-passage of said trunk, and adapted to conduct the steam therefrom to the top of the condensing-chamber and discharge the same above the water, while it excludes the water from the steam-passage, substantially as set forth.

5. In a lubricator, the combination of a water-reservoir provided with a steam-passage which conducts steam from the steam-pipe to said reservoir, whereby a condensing-chamber is formed therein, a transparent cylinder located below the water-reservoir, an inverted siphon-tube, and a water-supply-regulating valve arranged and adapted to govern the flow of water from the water-reservoir to the siphon delivery-tube within the transparent cylinder, substantially as set forth.

6. In lubricators, the combination of the supporting-trunk having separate steam and oil passages, a water-reservoir attached to the upper side of said trunk, a tube for supplying steam to the upper end of said reservoir, a glass cylinder connected with the lower side of said trunk, a siphon-tube or water-seal suspended from said trunk within said glass cylinder, and a water-passage provided with a governing-valve, said passage communicating from the neck of said reservoir to the entrance of said siphon-tube, all substantially as and for the purpose set forth.

In testimony whereof we affix our signatures in presence of two witnesses.

J. VINCENT RENCHARD.
JOHN J. RENCHARD.

Witnesses:
MARTIN J. DUNN,
H. C. RENCHARD,
WM. GUNN,
W. H. BELL.